(12) United States Patent
Alhaddad et al.

(10) Patent No.: US 12,732,384 B2
(45) Date of Patent: Sep. 8, 2026

(54) SYSTEMS AND METHODS FOR SECURELY ADDING AND REMOVING USERS FROM A SIGNING GROUP FOR KEY-BASED TRANSACTIONS IN MULTI-PARTY COMPUTATION SYSTEMS

(71) Applicant: MPC Holding, Inc., New York, NY (US)

(72) Inventors: Nicolas Alhaddad, Boston, MA (US); Olaf Stelling, Florence (IT); Cat-Tuong Le-Huy, London (GB)

(73) Assignee: MPC HOLDING, INC., Concord, NH (US)

( * ) Notice: Subject to any disclaimer, the term of this patent is extended or adjusted under 35 U.S.C. 154(b) by 99 days.

(21) Appl. No.: 18/746,162

(22) Filed: Jun. 18, 2024

(65) Prior Publication Data

US 2026/0052026 A1 Feb. 19, 2026

Related U.S. Application Data

(60) Provisional application No. 63/508,958, filed on Jun. 19, 2023.

(51) Int. Cl.
*H04L 9/32* (2006.01)
*G06Q 20/40* (2012.01)
*H04L 9/08* (2006.01)

(52) U.S. Cl.
CPC ............ *H04L 9/3255* (2013.01); *H04L 9/085* (2013.01); *H04L 9/3247* (2013.01); *G06Q 20/401* (2013.01); *H04L 2209/56* (2013.01)

(58) Field of Classification Search
CPC ..... H04L 9/3255; H04L 9/085; H04L 9/3247; H04L 2209/56; H04L 9/088; H04L 9/0891; H04L 9/16; H04L 9/50; G06Q 20/401
See application file for complete search history.

(56) References Cited

U.S. PATENT DOCUMENTS 10,084,596 B1 9/2018 Triandopoulos et al.
10,211,977 B1 2/2019 Roth et al.
(Continued)

FOREIGN PATENT DOCUMENTS

CN 115134086 A 9/2022

OTHER PUBLICATIONS

A. Kate and I. Goldberg, "Distributed Key Generation for the Internet," 2009 29th IEEE International Conference on Distributed Computing Systems, Montreal, QC, Canada, 2009, pp. 119-128, doi: 10.1109/ICDCS.2009.21. (Year: 2009).*
(Continued)

*Primary Examiner* — Hadi S Armouche
(74) *Attorney, Agent, or Firm* — Barnes & Thornburg LLP

(57) ABSTRACT

The disclosure describes technology for adjusting a quantity of users in a signing group for authorizing transactions utilizing multi-party-computation (MPC). A method can include receiving, by a server from a first signing client device amongst signing client devices in a signing group, a request to add or remove a signing client device from the group, the group including a polynomial designating a first threshold of devices required to authorize a transaction using respective shares of a cryptographic key, transmitting, to each remaining device in the group, a request for authorizing the request, receiving, from each, authorization of the request, initiating communication amongst a modified group of devices resulting from the authorization to generate new shares of the cryptographic key based on a bivariate polynomial having a second threshold signing requirement different from the first threshold, authenticating the new shares using the second threshold, and returning authentication of the new shares.

20 Claims, 9 Drawing Sheets

(56) References Cited

U.S. PATENT DOCUMENTS

| | | | |
|---|---|---|---|
| 10,291,622 B1 | 5/2019 | Rossman et al. | |
| 11,418,329 B1 | 8/2022 | Miller | |
| 11,431,490 B1 | 8/2022 | Ranellucci | |
| 11,689,371 B2 * | 6/2023 | Yadlin | G06F 21/44 713/168 |
| 12,014,361 B2 * | 6/2024 | Suurkivi | G06Q 20/401 |
| 2017/0222802 A1 | 8/2017 | Rubin et al. | |
| 2018/0167203 A1 | 6/2018 | Belenko | |
| 2019/0372761 A1 * | 12/2019 | Lampkins | H04L 9/3236 |
| 2020/0044863 A1 | 2/2020 | Yadlin et al. | |
| 2020/0145231 A1 | 5/2020 | Trevethan | |
| 2020/0153640 A1 * | 5/2020 | Ranellucci | H04L 9/3255 |
| 2020/0204357 A1 | 6/2020 | Seyfried et al. | |
| 2020/0213113 A1 | 7/2020 | Savanah et al. | |
| 2020/0336313 A1 | 10/2020 | Knox | |
| 2021/0051003 A1 | 2/2021 | Jarjoui et al. | |
| 2021/0111877 A1 * | 4/2021 | Craige | H04L 9/0825 |
| 2021/0119781 A1 | 4/2021 | Liu et al. | |
| 2021/0135855 A1 | 5/2021 | Sunkavally | |
| 2021/0158444 A1 | 5/2021 | Di Nicola et al. | |
| 2021/0194676 A1 | 6/2021 | Mandal et al. | |
| 2021/0273921 A1 | 9/2021 | Kumar et al. | |
| 2023/0155989 A1 | 5/2023 | Kumar et al. | |
| 2023/0245111 A1 | 8/2023 | Everspaugh et al. | |
| 2023/0246850 A1 * | 8/2023 | Everspaugh | H04L 9/50 713/180 |
| 2023/0421397 A1 | 12/2023 | Ocegueda et al. | |
| 2024/0296445 A1 * | 9/2024 | Parry | G06Q 20/065 |
| 2024/0420125 A1 * | 12/2024 | Le-Huy | G06Q 20/3825 |

OTHER PUBLICATIONS

International Search Report and Written Opinion in PCT/US2024/034425, dated Oct. 9, 2024, 12 pages.

Kate et al., "Distributed Key Generation for the Internet", Distributed Computing Systems, ICDCS 2009, 29th IEEE International Conference, Piscataway, NJ, Jun. 22, 2009, 20 pages.

Catrina et al., "Fostering the Uptake of Secure Multiparty Computation in E-Commerce", Third International Conference on Availability, Reliability and Security, IEEE, Piscataway, NJ, Mar. 4, 2008, 9 pages.

Maram et al., "CHURP:Dynamic-Committee Proactive Secret Sharing", In 2019 ACMS IGSAC Conference on Computer and Communications Security (CCS '19), Nov. 11-15, 2019, London, United Kingdom. ACM, New York, NY, USA, 18 pages. https://doi.org/10.1145/3319535.3363203.

* cited by examiner

200

210

| | | $P_1$ | $P_2$ | $P_3$ | $P_4$ | $P_5$ | $P_6$ |
|---|---|---|---|---|---|---|---|
| | $f(0) = s$ | X | $S'_2$ | $S'_3$ | $S'_4$ | $S'_5$ | $S'_6$ |
| $P_1$ | $f(1) = s_1$ | | | | | | |
| $P_2$ | $f(2) = f'_2(0) = s_2$ | $f'_2(1)$ | $f'_2(2)$ | $f'_2(3)$ | $f'_2(4)$ | $f'_2(5)$ | $f'_2(6)$ |
| $P_3$ | $f(3) = f'_3(0) = s_3$ | $f'_3(1)$ | $f'_3(2)$ | $f'_3(1)$ | $f'_3(1)$ | $f'_3(1)$ | $f'_2(6)$ |
| $P_4$ | $f(4) = f'_3(0) = s_3$ | $f'_4(1)$ | $f'_4(1)$ | $f'_4(1)$ | $f'_4(1)$ | $f'_4(1)$ | $f'_2(6)$ |
| $P_5$ | | | | | | | |
| $P_6$ | | | | | | | |

212

| | | $P_1$ | $P_2$ | $P_3$ | $P_4$ | $P_5$ | $P_6$ |
|---|---|---|---|---|---|---|---|
| | $f(0) = s$ | | $S'_2$ | $S'_3$ | $S'_4$ | $S'_5$ | $S'_6$ |

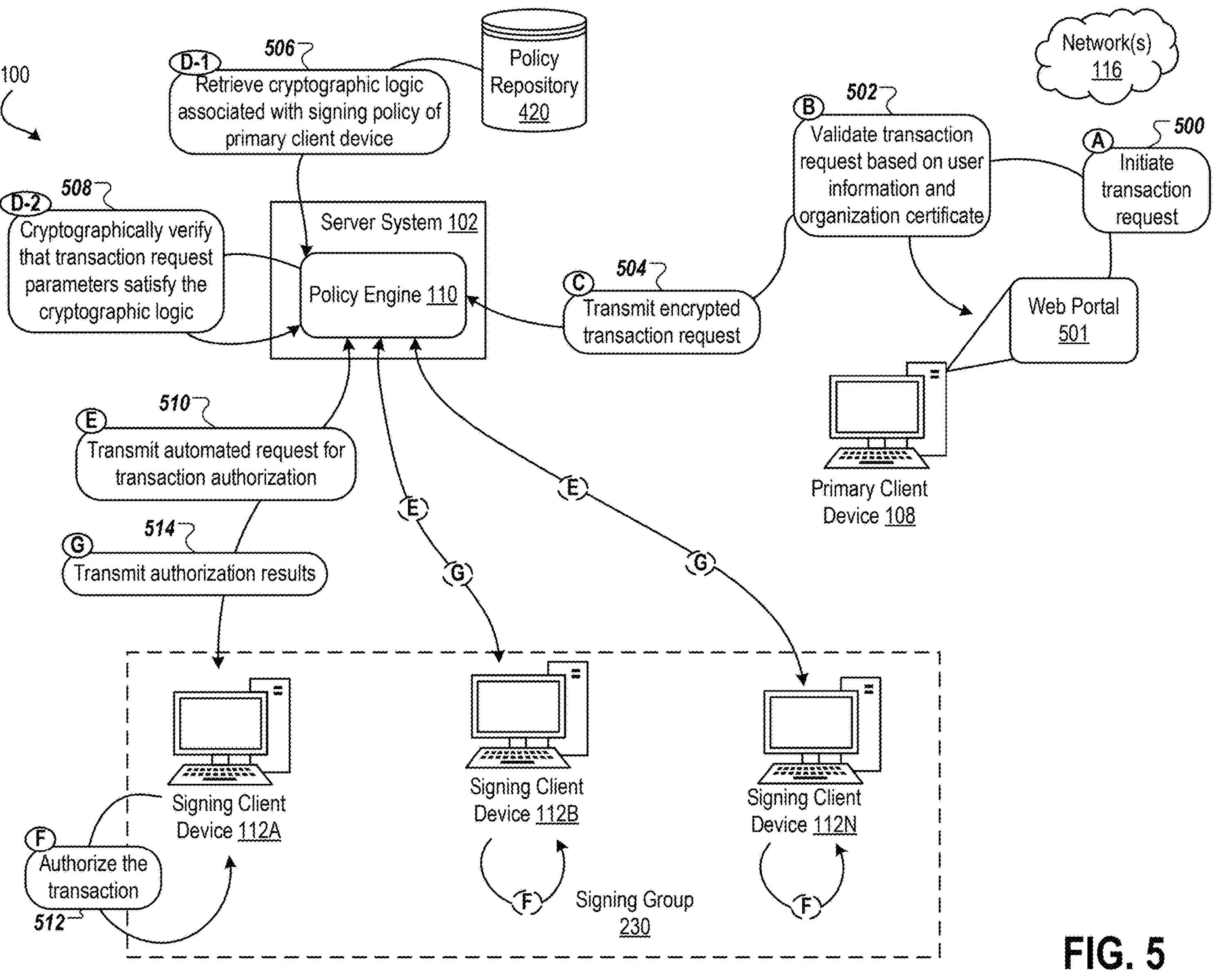
100
D-1 Retrieve cryptographic logic associated with signing policy of primary client device
506
Policy Repository 420
Network(s) 116
B Validate transaction request based on user information and organization certificate
502
A Initiate transaction request
500
D-2 Cryptographically verify that transaction request parameters satisfy the cryptographic logic
508
Server System 102
Policy Engine 110
C Transmit encrypted transaction request
504
Web Portal 501
Primary Client Device 108
E Transmit automated request for transaction authorization
510
G Transmit authorization results
514
E
G
Signing Client Device 112A
Signing Client Device 112B
Signing Client Device 112N
F Authorize the transaction
512
F
Signing Group 230
FIG. 5

SYSTEMS AND METHODS FOR SECURELY ADDING AND REMOVING USERS FROM A SIGNING GROUP FOR KEY-BASED TRANSACTIONS IN MULTI-PARTY COMPUTATION SYSTEMS

INCORPORATION BY REFERENCE

This application claims the benefit of U.S. Provisional Ser. No. 63/508,958, filed Jun. 19, 2023, the entirety of which is incorporated by reference herein.

TECHNICAL FIELD

This document generally describes devices, systems, architectures, and methods related to securely adding and removing users from a signing group for key-based transactions in multi-party computation ("MPC") technology.

BACKGROUND

Multi-party computation techniques can include cryptographic protocols for distributing a computation across multiple parties where no individual party may see other parties' data. MPC techniques can be used for performing secure transactions, such as cryptocurrency transactions, over networks, such as blockchains. A blockchain is a digitally distributed, decentralized, public ledger that can facility processes of recording transactions and tracking assets across a network.

Distributed Key Generation (DKG) is a protocol that can be used in cryptography to generate a secret key in a distributed manner, meaning no single user can know the entire key.

This method can be used in distributed systems for improved security and robustness. In the DKG protocol, each user can generate a piece of the key and then distribute a specially constructed "share" of their piece to each of the other users. These shares can be created in such a way that they can be used to reconstruct the original piece, but may be useless on their own. In the end, each user can end up with a collection of shares (one from each of the other users), which they can combine to create their portion of the shared key. Even if some users are compromised or fail to deliver their shares, as long as a sufficient number of users successfully exchange shares, the key can still be generated. Once all the shares have been exchanged and each user has generated their portion of the key, the full key can be assembled. However, in most DKG protocols, the full key may never actually be constructed in one place. Instead, each user keeps their portion of the key, and operations requiring the full key can be done in a distributed manner, with each user operating on their piece of the key. DKG can also be used to generate a public-private key pair where the private key is shared among users. The public key can be generated in a way that does not reveal information about the individual shares of the private key.

To transact over networks, such as blockchains, parties can establish wallets. A wallet is a type of blockchain wallet (e.g., crypto wallet) that requires more than one party to authorize transactions with assets to and from the wallet. The process of generating wallet keys and creating digital signatures can therefore be executed by different parties running a distributed key generation protocol. A wallet typically consists of a public key (or address) and a private key. MPC techniques can be used to secure and authorize transactions involving the wallet, such as by requiring a threshold quantity of signatures to authorize a transaction.

SUMMARY

This document generally describes devices, systems, architectures, and methods related to MPC cryptographic technology that allows for adding and removing users from a signing group to securely manage and authorize MPC transactions. MPC techniques can split of piece of data into multiple encoded parts, or primitives, known as secret shares, and can use the distribution of those secret shares across a pool of distinct actors to perform management and authorization of MPC transactions. On their own, the shares may reveal nothing about the original data, but if two or more users (or another minimum threshold of users designated for an MPC signing group) perform the same operation on a set of secret shares to create a computational equivalent of the secret shares, it is as if that operation was performed on the original data to generate a result. The signing group can be used to authenticate various different types of transactions, including but not limited to authenticating blockchain transactions, cryptocurrency transactions, smart contracts, documents, or other types of exchanges between multiple parties in an environment such as an MPC environment. The disclosed technology can be applied in a variety of other use cases, including being added to an MPC solution for authorizing a transaction, the transaction being any type of business transaction, crypto transaction, wire instructions, or other operations/actions, such as opening/locking a door or other secure environment.

The disclosed technology allows for adding or removing users from the signing group, including modifying the underlying size of the signing group and polynomial threshold used by the signing group, without having to remove the group altogether. Rather, a secret, such as a cryptographic key can be re-shared to a threshold quantity of users in the signing group in response to receiving a request from one of the users to add or remove another user. The threshold quantity of users can approve the request to add or remove another user by having the staying users agree on a different sharing of the same secret and at the same time create the appropriate new shares. This is mathematically done by letting the staying users agree and compute a bivariate polynomial where the constant coefficient at (0,0) is shared among two univariate polynomials. The two univariate polynomials are compromised from the old common polynomial with the old threshold (and the secret as the constant coefficient), while the second polynomial is the new common polynomial with the new threshold (and the secret as the constant coefficient). Group authentication information can then be updated to reflect the polynomial with the new threshold that may be required to rebuild the cryptographic key. To remove a user, the staying users compute new shares and choose not to give the removed user any new shares under the new polynomial. This will render any shares that they have useless. As a result, the signing group does not have to be deleted or removed, and the authentication information for the group can simply be updated. In some implementations, the threshold quantity of users in the signing group can be adjusted during a regeneration cycle. The regeneration cycle can occur when a new cryptographic key is generated. During the regeneration cycle, users can be added and/or removed and the threshold can be updated. In some implementations, during the regeneration cycle, all the users can be kept the same but the threshold can be changed. Updating the threshold can be dependent on going through the regeneration cycle and independent of the operations performed to add and/or remove the users.

Cryptographic data supporting the signing group should correspond to the signing group. Traditionally, a signing group may be limited or specific to a defined number of uses, for example. In the traditional configurations, when a user is removed, the user may actually be removed from the systems (e.g., server systems and other computing devices interacting with each other to authenticate transactions in a secure environment), but the underlying cryptographic material may remain the same. The disclosed technology, on the other hand, requires that when a user is requested to be removed from (or added to) the signing group, the underlying cryptographic material must be re-computed to ensure that the underlying cryptographic material remains secure.

Shamir Secret Sharing based DKG can be used with the disclosed technology, which can be based on polynomials. Each user can have a different evaluation of a common polynomial whose constant coefficient encodes a secret. The common polynomial can be private and not known to any single user. However, a threshold of the users can communicate and assemble the polynomial (including the secret) if necessary. The common private polynomial can be used for authentication even though none of the users may know the underlying coefficients (including the constant coefficient). Sometimes, all parties may be needed to generate the common polynomial, however other threshold quantities of users may be required in different implementations of the disclosed technology. For example, to produce a common polynomial where all users are needed, one can choose the common polynomial to be the sum of polynomials where each polynomial is known and chosen at random by one user. For example, if every participant produces a polynomial $f_i$, the common polynomial can be $$f = \sum_{i=1}^{n} f_i.$$

Every user 'i' can send a share $f_i(j)$ to every other user 'j'. Once a participant 'i' receives a share from every other party $p_j$, it sums them up and produces a share of the random common polynomial.

One or more embodiments described herein can include a method for adjusting a quantity of users in a signing group for authorizing transactions utilizing multi-party-computation (MPC) across a network, the method including: receiving, by a server from a first signing client device amongst a group of signing client devices included in a signing group, a request to add or remove at least one signing client device from the signing group, the signing group including a polynomial designating a first threshold of signing client devices in the signing group that can be required to authorize a transaction using respective shares of a cryptographic key, transmitting, by the server to each remaining signing client device in the signing group, a request for authorizing the request to add or remove the at least one signing client device from the signing group, receiving, by the server from each remaining signing client device in the signing group, authorization of the request to add or remove the at least one signing client device from the signing group, where a modified signing group including a modified group of signing client devices can result from the authorization of the request, initiating, by the server in response to receiving the authorization from each remaining signing client device, communication amongst the modified group of signing client devices to generate new shares of the cryptographic key based on a bivariate polynomial that has a second threshold signing requirement different from the first threshold, authenticating, by the server, the new shares using the second threshold, and returning, by the server, authentication of the new shares of the cryptographic key.

In some implementations, the embodiments described herein can optionally include one or more of the following features. For example, returning, by the server, authentication of the new shares of the cryptographic key can include updating authentication information associated with the signing group to include information that may include unique identifiers corresponding to each signing client device of the modified group of signing client devices, where the modified group of signing client devices can include the at least one added or removed signing client device. In some implementations, initiating, by the server in response to receiving the authorization from each remaining signing client device, communication amongst the modified group of signing client devices to generate new shares of the cryptographic key based on a bivariate polynomial that has a second threshold signing requirement different from the first threshold can include: generating, by each signing client device in the modified group of signing client devices, a new random polynomial where a constant coefficient of the new random polynomial can be an old share for the respective signing client device with the second threshold. The method can also include distributing, by each signing client device in the modified group of signing client devices, the new shares based on generating the new random polynomials. The method can also include aggregating, by each signing client device in the modified group of signing client devices, the new random polynomials of the signing client devices in the modified group to construct the bivariate polynomial of a degree to the first threshold in one dimension and the second threshold in a different dimension. The method can additionally include deleting, by each signing client device in the modified group of signing client devices, non-used shares of the cryptographic key.

Sometimes, the method can include receiving, by the server and from a primary client device, policy data that can define a transaction signing policy. The policy data can include: (i) a designation of the signing group, (ii) a designation of the group of signing client devices that may be included in the signing group, and (iii) for each transaction class of a group of transaction classes, a corresponding first threshold number of the group of signing client devices that may be required to authorize the transaction, where the transaction can be a member of the transaction class. The group of signing client devices may not include the primary client device.

One or more embodiments described herein can include a system for adjusting a quantity of users in a signing group for authorizing transactions utilizing multi-party-computation (MPC) across a network, the system including: a group of signing client devices, and a server in wireless network communication with the group of signing client devices, where the server can be configured to: receive, from a first signing client device amongst the group of signing client devices included in a signing group, a request to add or remove at least one signing client device from the signing group, where the signing group can include a polynomial designating a first threshold of signing client devices in the signing group that may be required to authorize a transaction using respective shares of a cryptographic key, transmit, to each remaining signing client device in the signing group, a request for authorizing the request to add or remove the at least one signing client device from the signing group, receive, from each remaining signing client device in the signing group, authorization of the request to add or remove the at least one signing client device from the signing group, where a modified signing group including a modified group of signing client devices can result from the authorization of the request, initiate, in response to receiving the authorization from each remaining signing client device, communication amongst the modified group of signing client devices to generate new shares of the cryptographic key based on a bivariate polynomial that can have a second threshold signing requirement different from the first threshold, authenticate the new shares using the second threshold, and return authentication of the new shares of the cryptographic key.

The system can optionally include one or more of the following features. For example, returning authentication of the new shares of the cryptographic key can include updating authentication information associated with the signing group to include information that may include unique identifiers corresponding to each signing client device of the modified group of signing client devices. The modified group of signing client devices can include the at least one added or removed signing client device. As another example, initiating, in response to receiving the authorization from each remaining signing client device, communication amongst the modified group of signing client devices to generate new shares of the cryptographic key based on a bivariate polynomial that has a second threshold signing requirement different from the first threshold can include: generating, by each signing client device in the modified group of signing client devices, a new random polynomial where a constant coefficient of the new random polynomial can be an old share for the respective signing client device with the second threshold.

In some implementations, the system can also include distributing, by each signing client device in the modified group of signing client devices, the new shares based on generating the new random polynomials. The system can also include aggregating, by each signing client device in the modified group of signing client devices, the new random polynomials of the signing client devices in the modified group to construct the bivariate polynomial of a degree to the first threshold in one dimension and the second threshold in a different dimension. The system can include deleting, by each signing client device in the modified group of signing client devices, non-used shares of the cryptographic key.

As another example, the server can further be configured to receive, from a primary client device, policy data that can define a transaction signing policy. The policy data can include: (i) a designation of the signing group, (ii) a designation of the group of signing client devices that are included in the signing group, and (iii) for each transaction class of a group of transaction classes, a corresponding first threshold number of the group of signing client devices that can be required to authorize the transaction, the transaction being a member of the transaction class. Sometimes, the group of signing client devices may not include the primary client device.

The devices, system, and techniques described herein may provide one or more of the following advantages. For example, the disclosed technology can provide a mechanism for securely and efficiently modifying MPC signing groups, as well as the size of those groups, by refreshing shares in a manner that can be accomplished without having to reform the group. For instance, conventionally an MPC group will be designated with a polynomial to a certain factor (e.g., $x^2$) where the factor dictates the size the group and the minimum number of users required for signing for the MPC group. However, once that polynomial and its factors have been designated for an MPC group, it may not be readily changed or adapted—meaning that modifications to the size of the group via adding or removing users may not be accomplished without deleting and reforming the MPC group with a new polynomial adapted for the modified group size. The disclosed technology provide a mechanism for MPC signing group size modifications to be accomplished without such deletion and reformation of the MPC group, which permits for greater efficiency, security, and adaptability related to MPC groups.

Moreover, the disclosed technology can provide a decentralized solution that does not rely on any single trusted party to secure secret keys. Traditional methods of adding and removing users can require a trusted party to reconstruct the secret key (and a corresponding common polynomial). When removing a user, the trusted party would compute another polynomial where the constant coefficient is the same secret, the trusted party would then choose not to give a new share to the removed user but give new shares to all remaining users. Similarly, for adding a new user, the trusted party would reconstruct the common polynomial and give the new party their share (an evaluation of the polynomial). Furthermore, if the threshold should be changed, then a new polynomial with the same constant coefficient but with a different degree must be computed. However, to do so with traditional methods, the secret key may be exposed to a centralized point of failure. If the trusted party is hacked or chooses to exploit this trust by saving the secret (an act that is hard to detect and protect against), this can undermine underlying benefits of MPC systems in the first place.

The disclosed technology provides increased security of blockchain assets, such as cryptocurrencies, other digital assets, and other types of blockchain-based information (e.g., non-fungible tokens (NFTs), digital records). After all, a central server system does not maintain control over parties' wallets, decisions, broadcasting to one or more blockchains, and/or the currency or asset itself. Rather, such control remains with the transacting parties themselves. Moreover, the server system may not have access to, or otherwise come into possession or control of a crypto private key for a wallet, and therefore may be unable to retrieve the crypto private key. Instead, the crypto private key may be generated solely at an hardware security module (HSM) solely at the direction of the authorized users. The generation of the crypto private key can be conditioned upon confirmation through a server system-developed, automated policy engine, for which only a particular party (e.g., a party initiating a transaction) has the ability to define parameters for key generation. Such a multi-factor security system described herein may also provide that neither the transacting party nor the server system is independently able to complete a transaction in cryptocurrency controlled by the party's wallet. The server system may not initiate, view contents of, and/or stop a transaction by the party. The server system also may not have independent control of the party's blockchain wallet (e.g., cryptocurrency wallet), the signing policies defined by the party, or any given transaction. As described herein, a sufficient number of authentications using signing user credentials defined by the party in the signing policies may be necessary to satisfy a relevant wallet policy engine and then can cause the server system-developed automated policy engine to generate a signed transaction request that will be accepted by an HSM for generation of an actual crypto key-signed blockchain transaction message.

In another example, the disclosed technology can be used and extended to any of a variety of blockchain contexts to improve overall security and control related to MPC transactions, such as blockchain transactions related to cryptocurrencies, digital records, and/or other blockchain assets. The disclosed technology can additionally be used outside of a specific blockchain context, and may be more broadly applicable to provision and management of MPC authentications and authorizations related to digital interactions that may require the consent of multiple parties for fulfillment. The disclosed technology may also be used to secure core infrastructure as an additional layer for supervisory control and data acquisition (SCADA) systems. The disclosed technology can be used to secure access to high security assets (e.g., buildings, vaults). The disclosed technology can be implemented as part of an approval business workflow that may require multiple parties to engage at multiple different levels of the business structure. In yet some implementations, the disclosed technology can be used to enable kill chains for various types of battle systems.

The details of one or more implementations are set forth in the accompanying drawings and the description below. Other features and advantages will be apparent from the description and drawings, and from the claims.

BRIEF DESCRIPTION OF THE DRAWINGS

FIG. 5 is a conceptual diagram of a system for initiating transactions and obtaining approval or authorization by signing client devices according to user-defined signing policies.

Like reference symbols in the various drawings indicate like elements.

DETAILED DESCRIPTION OF ILLUSTRATIVE EMBODIMENTS

This document generally relates to systems, techniques, and methods for adding and removing users from a signing group that authorizes transactions to be performed using MPC techniques across various networks.

The disclosed technology can be applied to various different types of transactions, such as business transactions that may include crypto transactions. As merely illustrative and non-limiting examples, the disclosed technology can be used for transactions of different types of cryptocurrencies and assets, including but not limited to BITCOIN, ETHEREUM, NEAR, USDC, ERC20 tokens, APTOS, COSMOS, ATOM, XRP, AVAX, DOT, and other types of assets or tokens that become available over time. The disclosed technology can also be applied to other transactions and/or processes over secure networks for authenticating different types of documents, cryptocurrencies, and other exchanges.

Secret sharing techniques can be used to divide a secret, such as a cryptographic key, into multiple parts. The cryptographic key can then be distributed amongst a group of users, each of which can be allocated a unique piece of the cryptographic key. The key may be reconstructed when enough of the distributed shares or pieces are combined. Polynomial interpolation can be used to divide the cryptographic key and distribute the resulting shares amongst the group of users. For example, a key 'S' can be represented as a point on a polynomial curve, specifically a constant term of a polynomial. For a threshold of 't+1', a polynomial of degree t can be constructed with the key 'S' as the constant term (e.g., y-intercept). The remaining coefficients can be chosen randomly. Once the polynomial is constructed, 'n' points on the curve can be evaluated and distributed to 'n' participants or users. These points (shares) do not include the constant term, which represents the secret 'S'. To reconstruct the key, at least 't+1' distinct points may be needed to interpolate the polynomial of degree t, and the constant term can then be evaluated. With fewer than t points, the polynomial may not be interpolated, and the key can remain safe. This can ensure that a certain number of the users (the threshold t+1) collaborate to reconstruct the key.

Figure 1A:
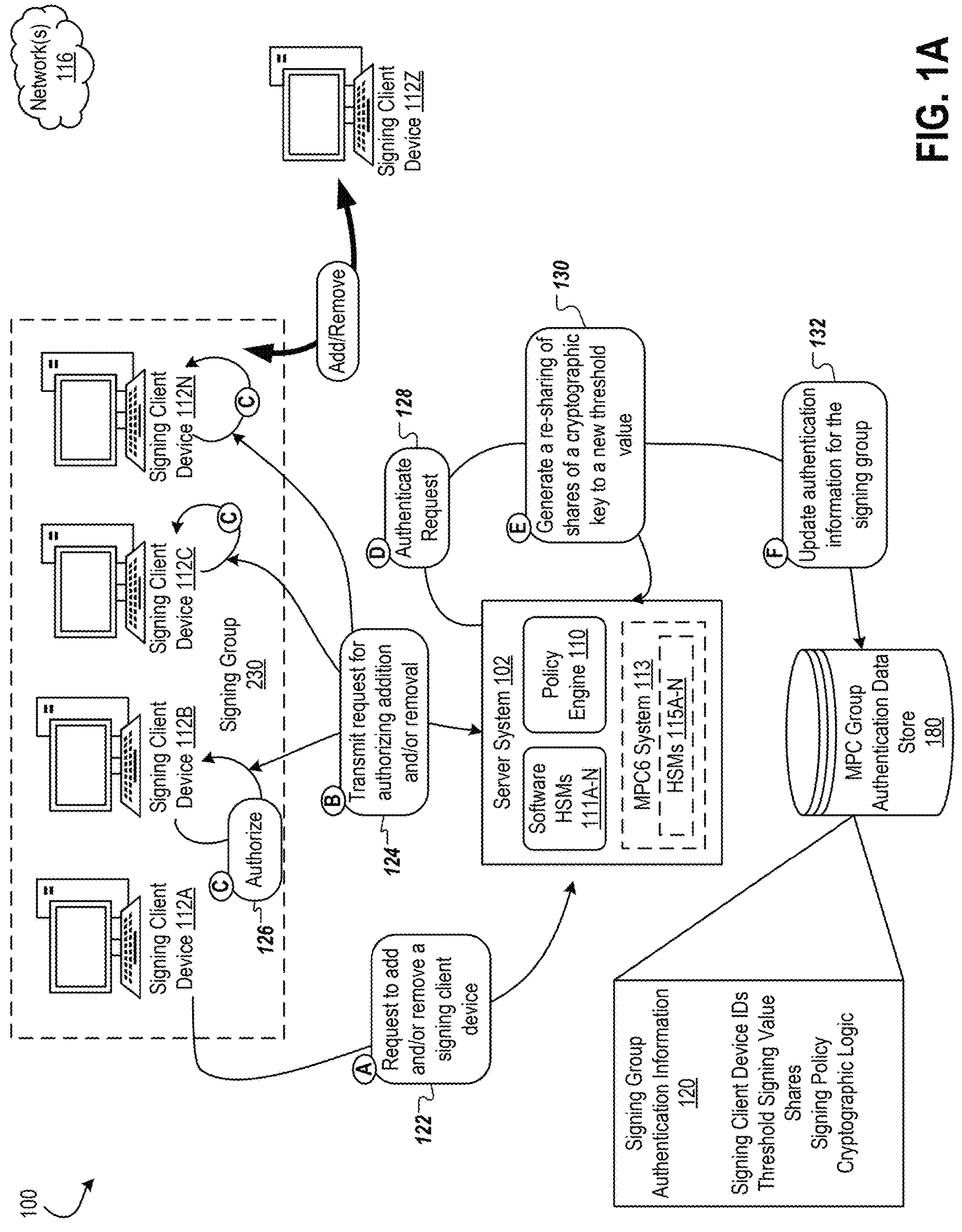
FIG. 1A is a conceptual diagram of a system for adding and removing users from a signing group that can sign transactions performed using MPC techniques over various networks.
Figure 3:
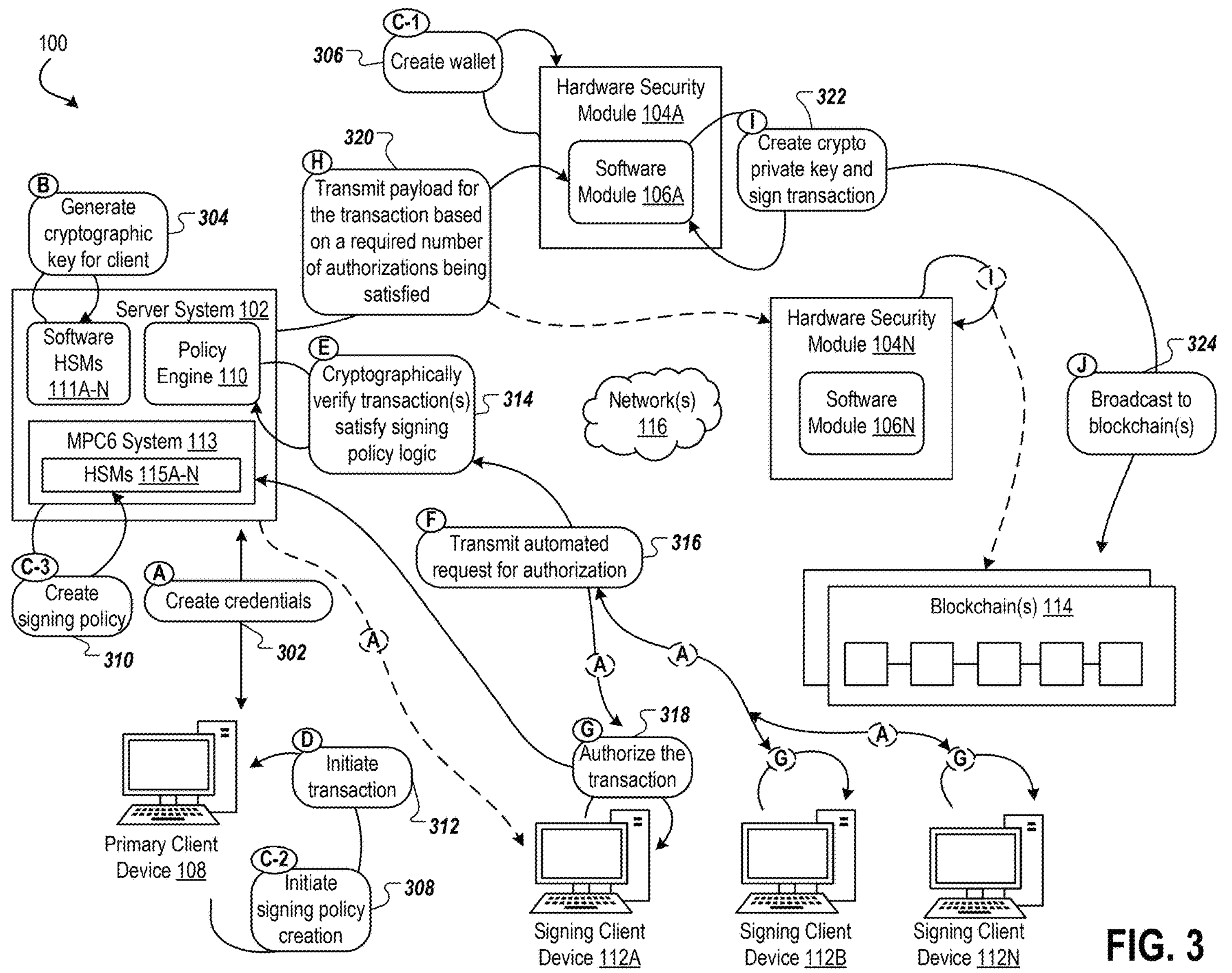
FIG. 3 is a conceptual diagram of a system for providing non-custodial crypto asset management using MPC techniques for parties to securely perform transactions over various networks.

Referring to the figures, FIG. 1A is a conceptual diagram of a system 100 for adding and removing users from a signing group that can sign transactions performed using MPC techniques over various networks. The system can include a server system 102 having one or more software HSMs 111A-N, a policy engine 110, an optional MPC6 system 113 with optional HSMs 115A-N. The system 100 can include one or more signing client devices 112A-N. The system 100 can include an MPC group authentication data store 180. Any of these system components can communicate (e.g., wired, wireless) via network(s) 116. Refer to FIG. 3 for further discussion about the system components.

The server system 102 can receive a request from one of the signing client devices 112A-N in a signing group 230, such as the signing client device 112A, to add and/or remove a signing client device, such as signing client device 112Z (block A, 122). The disclosed techniques of re-computing and re-sharing shares of a cryptographic key to members of the signing group 230 can be initiated by the rest received from the signing client device 112A.

The server system 102 can transmit a request for authorizing the addition and/or removal to one or more of the signing client devices 112A-N in the signing group 230 (block B, 124). For example, the request can be transmitted to all remaining group members, such as signing client devices 112B, 112C, and 112N. In some implementations, the request can be transmitted to a predetermined threshold quantity of members in the signing group 230, which can be defined by the policy engine 110 or one or more cryptographic logic described herein.

Figure 1B:
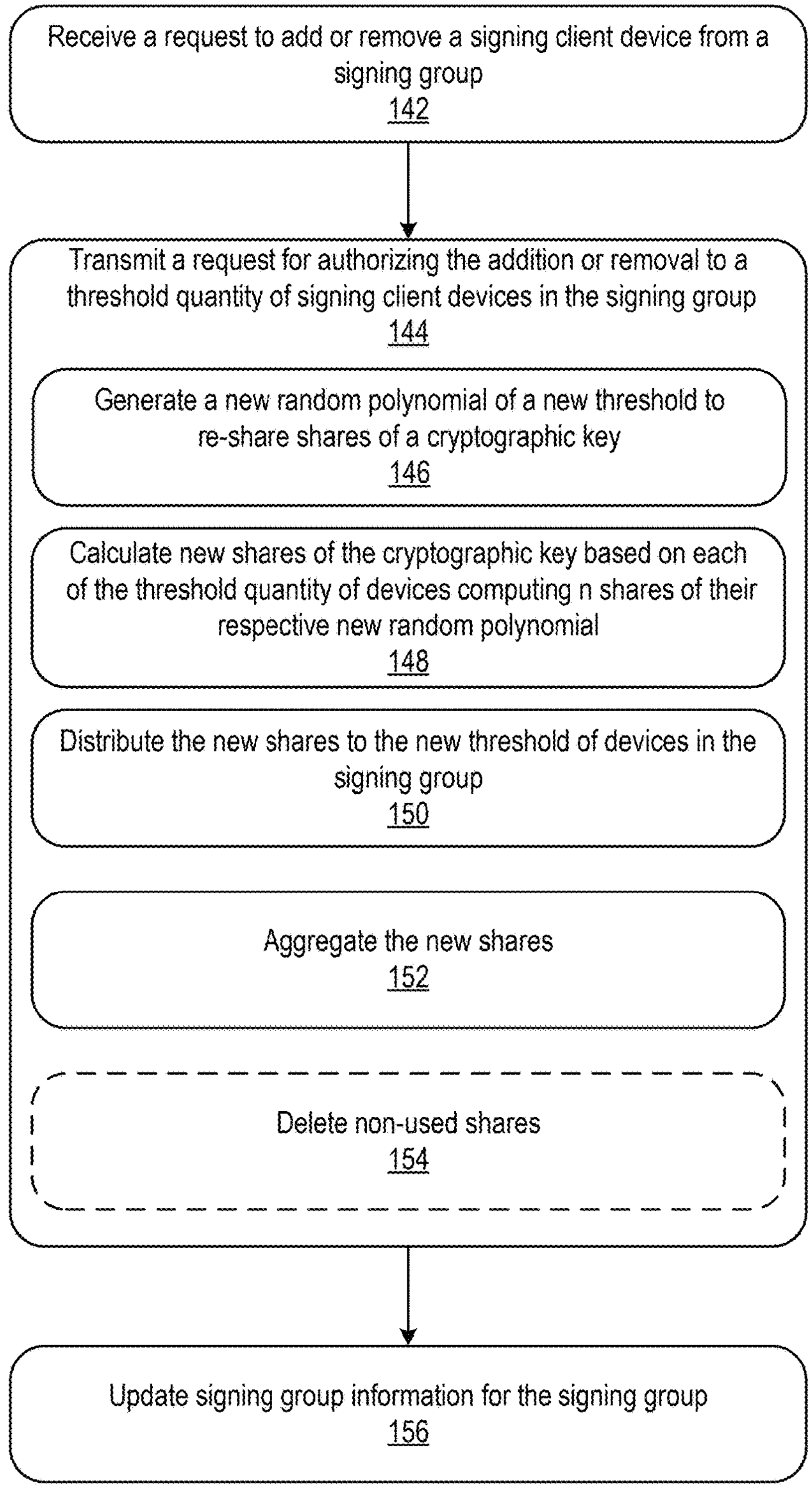
FIG. 1B is a flowchart of a process for adding and removing users from a signing group.

The receiving signing client devices 112B, 112C, and 112N can authorize the request in block C (126). Such authorization can be transmitted back to the server system 102, which can then authenticate the request (block D, 128) and generate a re-sharing of shares of the cryptographic key to a new threshold value for the signing group (block E, 130). Refer to FIG. 1B for further discussion about performing blocks C-E (126-130). The new threshold value can indicate a new threshold quantity of group members that may be required to authorize a transaction that can be initiated by one or more parties seeking to perform a transaction in a secure environment. In some implementations, as described herein, the new threshold value can be determined during a regeneration cycle, when a new cryptographic key is generated. During the regeneration cycle, the new threshold value can be determined but the group members may remain the same (group members may not be added or removed). In other implementations, both the new threshold value and the group members can be changed during the regeneration cycle. Refer to FIGS. 3-5 for further discussion.

As described further herein and in reference to block E (130), refreshing a shared key without changing the key itself can be done through a process called re-sharing. In this context, each of the group members can generate a new polynomial with a constant coefficient (degree 0 term) set to zero. A common polynomial f' can be generated where the constant coefficient is zero. That way, if the old common polynomial f is added up/summed with the new common polynomial f', a new polynomial f+f' can be generated, where the constant coefficient can be intact (e.g., the underlying cryptographic key remains the same). However, each other coefficient would have changed, which means each share of the key is going to be different.

Figure 2:
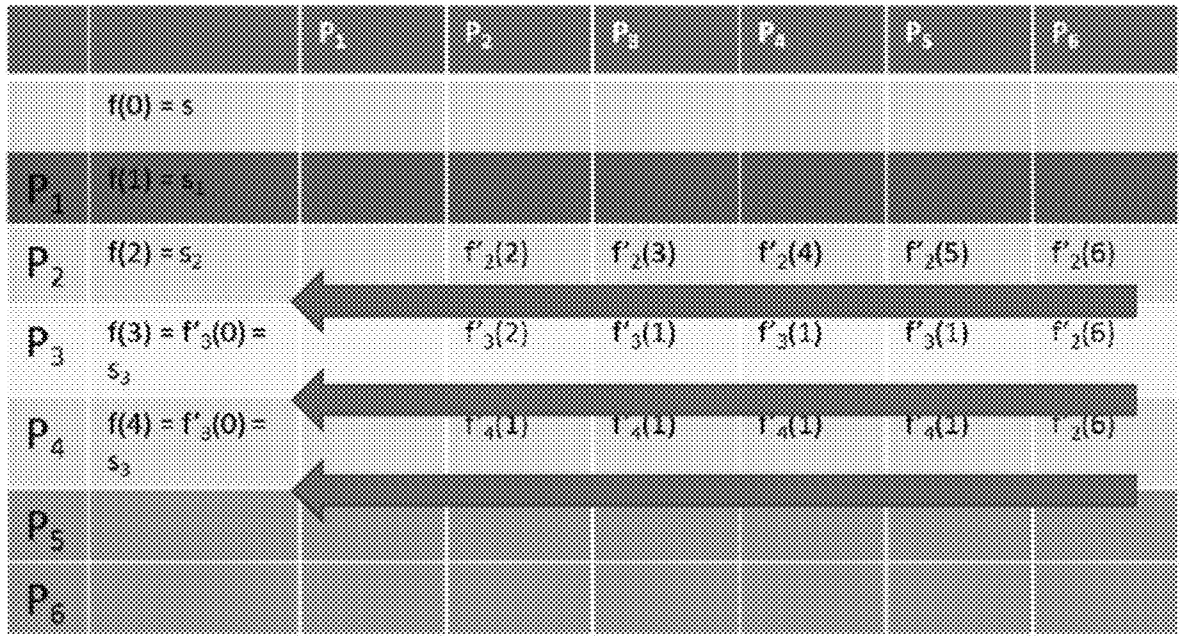
FIG. 2 illustrates example tables for adding and removing users from a signing group.

Accordingly, initially, a key 'S' can be shared amongst 'n' signing client devices 112A-N using the disclosed techniques. Each signing client device 'i' can have a share 'si,' which can be a point on an initial polynomial 'f(x)' where the constant term can be 's'. A new polynomial can then be generated. Each signing client device 'i' independently can generate a new polynomial 'f'i(x)' of degree 't' (where 't+1' can be the threshold), with the constant term set to 0. The rest of the coefficients can be chosen randomly. New shares can then be calculated. Each signing client device 'i' can compute new shares for every other signing client device 'j' by evaluating 'f'i(j)'. The new shares can be distributed. Each signing client device can securely send these new shares to the respective signing client devices. The new shares can be aggregated. Upon receiving the new shares, each signing client device 'j' can add the received shares to their original share. This may result in updated shares of the form 'sj+f'1(j)+f'2(j)+ . . . +f'n(j)'. because the constant term of each 'fi(x)' is 0, the constant term of a sum of the 'f'i(x)' polynomials can also be 0. Therefore, when the new shares are summed with the original shares, the constant term of the resulting polynomial (f+f') can remain the same, meaning the shared key still remains the same, even though the shares have been updated. Refer to FIGS. 1B and 2 for further discussion.

In block F, the server system 102 can update authentication information 120 for the signing group 230 in the data store 180 (132). The data store 180 can be encrypted and configured to securely maintain information about the cryptographic key and rules/logic for rebuilding the cryptographic key from shares that are generated and dispersed amongst the signing client devices 112A-N in the signing group 230. The data store 180 can maintain information such as the signing group authentication information 120. Among other things, the authentication information 120 can include unique, encrypted identifiers for each of the signing client devices 112A-N in the signing group 230, a threshold signing value (e.g., an old or previous threshold value before one or more signing client devices are added and/or removed from the signing group 230 as well as a new threshold value once the signing client device(s) is added and/or removed), shares information for the cryptographic key, one or more signing policies for the signing group 230 to follow when authorizing transactions, and/or cryptographic logic, as described further below.

FIG. 1B is a flowchart of a process 140 for adding and removing users from a signing group. When removing a user from the signing group (e.g., a signing client device), the user's share should become invalid. A refresh can be performed to make their share invalid. Sometimes a signing threshold can also be changed to cater for less users in the signing group. In some implementations, the signing threshold can be adjusted during a regeneration cycle for a cryptographic key, but the users in the signing group may remain the same. Accordingly, the signing threshold can be changed independently of processes being performed to add or remove users in the signing group. The same goes for adding users, in which the threshold can be changed. In order to support both adding and removing users, a secret, such as a cryptographic key, can be re-shared under a new random polynomial of a different threshold. Changing the threshold using the disclosed techniques can be done by re-sharing the secret with a different threshold value. The threshold determines how many shares of the secret may be required to reconstruct the secret. Accordingly, a second sharing of the constant coefficient (which corresponds to the secret) can be generated that has a different threshold. As described herein in the process 140, the users in the signing group can agree on a common bivariate polynomial with 2 different thresholds, a new threshold and an old threshold. The users in the signing group can delete the bivariate polynomial and only keep a univariate polynomial that can reconstruct the secret under the new threshold.

As an illustrative example, assume that an initial secret 's' exists that has been shared among 'n'' users using the sharing techniques described herein and with a threshold 't+1'. Furthermore, assume that n is the number of remaining users after adding and removing some of the users from the group. Each user 'i' can hold a share 'si,' which can be a point on the initial polynomial 'f(x)' where the constant term is 's'. Each staying user can choose a new random polynomial where the constant coefficient is their old share with the new threshold. If all the polynomials are then concatenated together, a bivariate polynomial of degree old threshold in one dimension and new threshold in a different dimension can be created.

The process 140 can be performed by the server system 102 described herein. In some implementations, the process 140 can be performed by any other computing system, secure enclave, cloud-based system, network of computing devices, and/or client device, such as a signing client device. For illustrative purposes, the process 140 is described from the perspective of a server system.

Referring to the process 140, the server system can receive a request to add and/or remove a signing client device, or a user, from a signing group (block 142).

In block 144, the server system can transmit a request for authorizing the addition and/or removal to a threshold quantity of signing client devices in the signing group. The threshold quantity can be all users in the signing group, including the user(s) to be removed. In some implementations, the threshold quantity can be all users in the signing group, excluding the user to be removed. In yet some implementations, the threshold quantity can be all users in the signing group including the user that requested the addition and/or removal. Sometimes, the threshold quantity can be less than all users in the signing group, such as a threshold quantity of users needed to sign and authorize a transaction according to signing logic described herein. As described herein, the threshold quantity can be determined, changed, and/or updated during a regeneration cycle of a cryptographic key. The threshold quantity can be determined independently of any processes being performed to add or remove users in the signing group.

A new random polynomial of a new threshold can be generated to re-share shares of a cryptographic key (e.g., secret) in block 146. For example, each user 'i' independently can generate a new polynomial 'f'i(x)' of degree 'tnew' where the constant term is their original share 'si', and the remaining coefficients are chosen randomly.

New shares of the cryptographic key can be calculated based on each of the threshold quantity of signing client devices computing n shares of their respective new random polynomial (block 148). For example, each user 'i' in the signing group can compute 'n' shares from their polynomial 'f'i(x)' by evaluating 'f'i(j)' for all 'j' in the range of users in the signing group.

The new shares can be distributed to the new threshold of signing client devices in the signing group (block 150). For example, each user 'i' may securely send these new shares to the corresponding user 'j' in the signing group.

The new shares can be aggregated in block 152. Every user 'j' in the signing group can combine the received shares using polynomial interpolation to produce their new share: 's'j=interpolate(f'1(j), f'2(j), . . . , f'n(j)') at 0.

Optionally, non-used shares can be deleted in block 154 (e.g., in a scenario in which users are being removed from the signing group). For example, each user 'j' can delete all shares and keeps s'j.

Signing group information for the signing group can accordingly be updated in block 156. For example, the information can be updated with the new threshold. The information can be updated with identifiers uniquely identifying each of the users in the signing group after the addition and/or removal of users.

The constant term of each of the 'f'i (x)' polynomials can be the original shares 'si', which can evaluate to 's' because they are shares of the same secret. The remaining users in the signing group can create a bivariate polynomial that can be evaluated to 's' when evaluated at (0,0). There are two ways to recover 's' either through interpolation of the first column polynomial or the new row polynomial. The first column can be made of a polynomial of degree t while the new row polynomial can be made of a polynomial of degree 't_new'. Therefore, the secret 's' can remain the same after the process 140, but it's now shared with a new threshold 't_new'.

Authorizing addition and/or removal of users can require active participation from all the remaining users in the signing group. If any user does not participate in the process of adding and/or removing a user, then the new shares may not be correctly computed, and the secret 's' may not be recoverable with the new shares.

FIG. 2 illustrates example tables 200, 210, and 220 for adding and removing users from a signing group. In the example of FIG. 2, the desired threshold of signing client devices or users in a signing group can be n=4 (e.g., 4 users needed to sign/authenticate a transaction). In this example, assume that P1 is desired to be removed, P5 and P6 are to be added, and any 4 users may be required to reconstruct a secret (e.g., cryptographic key) for performing a transaction (not 3 users). All remaining participants (P2, P3, and P4) independently can generate a new polynomial '$f'_i(x)$' of degree 3' where the constant term is their original share '$s_i$', and the remaining coefficients can be chosen randomly. Each user then computes 5 shares from their polynomial '$f'_i(x)$' by evaluating '$f'_i(j)$' for all 'j' in the range of users (2 . . . 6).

As shown in the table 200, P1 can be removed from the group, while P5 and P6 are being added to the group. Each of the remaining users in the group share their secret share using a new threshold. Any 4 points on each row can therefore reconstruct a share of the secret.

As shown in the table 210, all remaining users (P2, P3, P4) can send the proper share to all other users P2 . . . P6. Each user can interpolate their new share of the secret by interpolating from the shares it received from the old users.

As shown in the table 220, any old shares can then be securely deleted and only the new secret shares may be kept/maintained kept. Any 4 users remaining in the group can now reconstruct s.

FIG. 3 is a conceptual diagram of the system 100 for providing non-custodial crypto asset management using MPC techniques for parties to securely perform transactions over various networks. The system 100 can be used to perform cryptocurrency transactions over various ledgers, including but not limited to blockchains. The system 100 can be used to perform various other types of transactions, including but not limited to smart contract execution, other legal contract execution, document verification, other exchanges, etc. Although the system 100 is described in the perspective of cryptocurrency transactions, the system 100 can also be implemented and used in other use cases, including but not limited to healthcare, banking, contracting, legal industry, etc.

Figure 6:
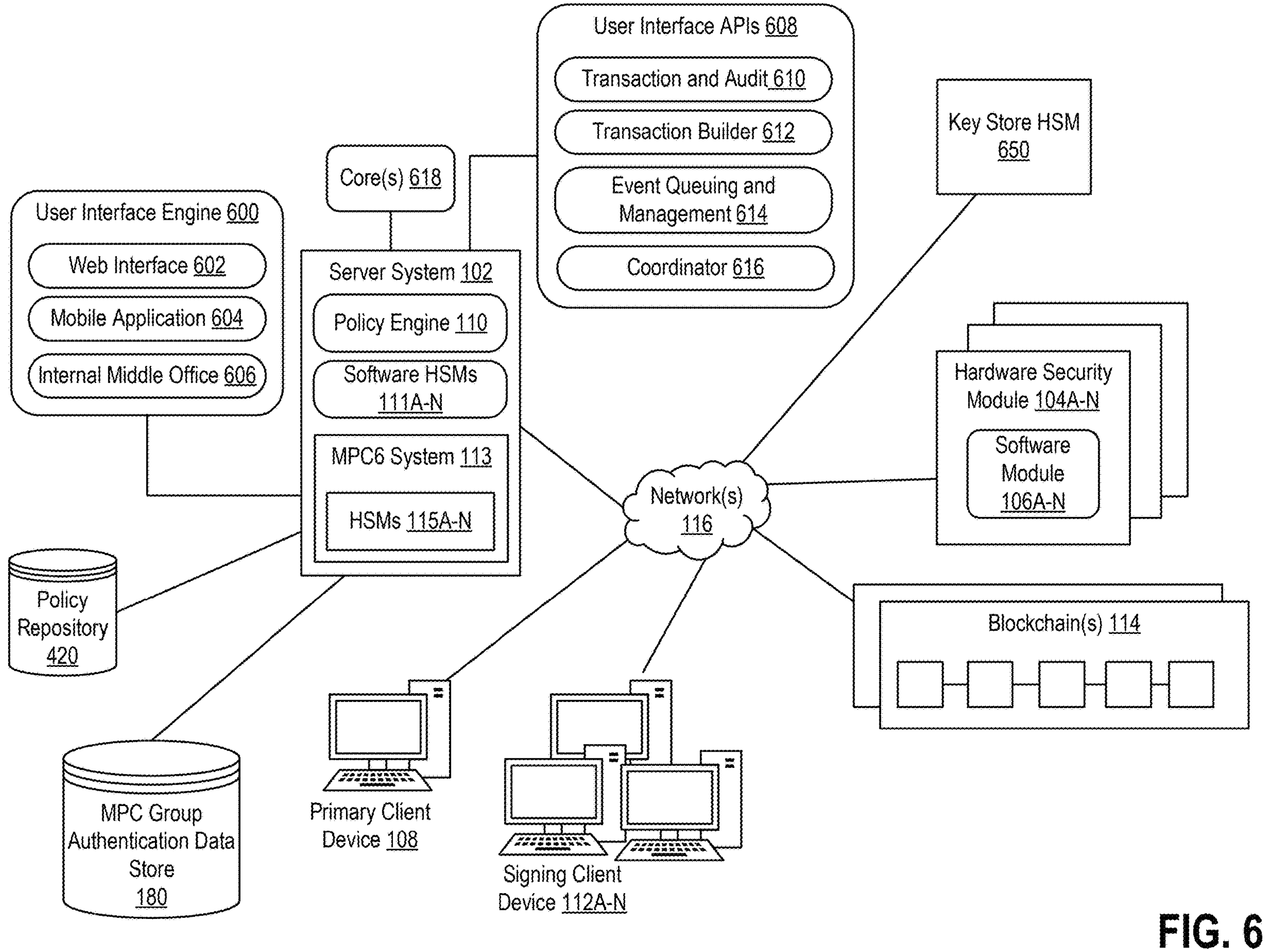
FIG. 6 is a system diagram of components that can perform the disclosed techniques.

In the system 100, the server system 102, hardware security modules (HSMs) 104A-N, primary client device 108, signing client devices 112A-N, and blockchain(s) 114 can communicate with each other (e.g., wired, wirelessly) via network(s) 116. The server system 102 can be any type of computing system, network of computing devices/systems, cloud-based computing system, secure enclave, etc. that can be configured to provide software to components such as the HSMs 104A-N, the primary client device 108, and the signing client devices 112A-N. The server system 102 can be used to generate and compute MPC-based authentication and authorization requests, which may be presented at a later time to the HSMs 104A-N as proof of authorization for signing and broadcasting to the relevant blockchain(s) 114. Refer to FIG. 6 for further discussion about software and other components that are provided by the server system 102.

The server system 102, for example, can include a policy engine 110, software HSMs 111A-N, and an MPC6 system 113. The MPC6 system 113 can further include one or more HSMs 115A-N. In some implementations, the policy engine 110 can be a software module deployed in one or more other computing environments, including but not limited to an enclave or one or more of the components described herein. The policy engine 110 can be configured to perform one or more of the disclosed techniques, such as ensuring that transactions requested by the primary client device 108 satisfy signing policies and parameters that are defined by the primary client device 108. The policy engine 110 can designate and administer differing conditions and levels of confirmation from one or more of the signing client devices 112A-N for various transactions associated with a wallet (such as a public wallet associated with the primary client device 108). The policy engine 110 can communicate and interact with other components in the system 100, such as a software module 106A-N at each of the HSMs 104A-N, the blockchain(s) 114, other components of the server system 102, and other client devices to authorize transactions on public wallets.

In brief, the HSMs 104A-N can each be a physical computing device that safeguards and manages secrets, such as digital keys, performs encryption and decryption functions for digital signatures, and provides authentication and/or other cryptographic functions. HSMs 104A-N can be plug-in cards and/or external devices that attach to computing systems, computing devices, and/or network servers. In some implementations, one or more of the HSMs 104A-N can be operated by and/or configured to the server system 102. One or more of the HSMs 104A-N can be remote from the server system 102 and configured to one or more computing systems, computing devices, network servers, and/or networks of computing devices associated with third parties. For example, a third party can host one or more of the HSMs 104A-N, which then communicate with components in the system 100 such as the server system 102.

Each of the HSMs 104A-N can include respective software modules 106A-N (e.g., multiple different instances of the software module across different HSMs 104A-N), which can be generated and provided to the HSMs 104A-N by the server system 102. The software module 106A-N can provide instructions for the HSMs 104A-N to create crypto private keys and sign transactions that are requested by the primary client device 108, authorized by a required threshold number of the signing client devices 112A-N, and then verified by the policy engine 110 of the server system 102 for satisfying requirements of the signing policy of the primary client device 108.

The primary client device 108 and signing client devices 112A-N can be any types of user computing devices, including but not limited to laptops, tablets, computers, mobile phones, smart phones, wearable devices, cloud-based computing systems, and/or networks of computing systems/servers. The primary client device 108 and the signing client devices 112A-N can provide the software platform generated by the server system 102 to their relevant users/parties.

The primary client device 108 can be operated by a party (e.g., user) that creates a wallet (e.g., public wallet) and uses the software platform generated and provided by the server system 102 to perform transactions in the system 100 (e.g., cryptocurrency transactions). The party also can establish signing policies with defined parameters (e.g., a minimum required number of signing client devices that must authorize a transaction before the transaction is verified, signed, then broadcasted) that are then used by the policy engine 110 to verify transactions that are requested by the primary client device 108.

The signing client devices 112A-N can be operated by other parties (e.g., users) that are selected to be part of one or more signing groups according to the signing policies and parameters defined by the primary client device 108. The signing client devices 112A-N can also run the software platform provided by the server system 102 to allow the associated parties to authorize (or not authorize) transaction requests that are made by the primary client device 108 or other client devices that request transactions across networks such as the blockchain(s) 114.

The blockchain(s) 114 can be any type of system and/or ledger that records transactions, such as cryptocurrency transactions. The blockchain(s) 114 can allow digital information to be recorded and distributed, but not edited/modified. Thus, the blockchain(s) 114 can be an immutable ledger, or record of transactions that cannot be altered, deleted, or destroyed. The blockchain(s) 114 can be maintained across multiple computing systems that may be linked over one or more networks. The blockchain(s) 114 can include public blockchains (e.g., permissionless distributed ledger on which anyone can join and conduct transactions), private blockchains (e.g., a blockchain network that may operate in a private context, such as a restricted network, or is controlled by a single entity), hybrid blockchains, etc.

Still referring to the system 100 in FIG. 3, the primary client device 108 and the server system 102 can communicate to create user credentials (as non-limiting examples, these can include username, password, etc.) in block A (302). The server system 102 can also optionally communicate with one or more of the signing client devices 112A-N to create user credentials for parties associated with the devices 112A-N. For example in block A (302), the server system 102 can communicate with the signing client devices 112A-N that do not yet have user credentials established but have been identified as part of a signing group for a signing policy of the primary client device 108. The server system 102 can communicate with the client devices 112A-N before or after one or more other blocks described herein (e.g., after the primary client device 108 creates a signing policy in block C-3, 310, as part of transmitting an automated request for transaction authorization in block F, 316, before verifying that a transaction satisfies the signing policy in block E, 314, etc.).

One or more of the software HSMs 111A-N of the server system 102 can generate a cryptographic key for the primary client based on the user credentials in block B (304). The process to generate the key can be initiated at the primary client device 108 and executed by the one or more software HSMs 111A-N.

In block C-1 (306), the HSM 104A can create a wallet for the primary client device 108, based at least in part on the user credentials and public key infrastructure (PKI) certificates.

In block C-2 (308), the primary client device 108 can initiate creation of a signing policy. Instructions to create/generate the signing policy can be transmitted to the server system 102 (e.g., in plain text format). Accordingly, the HSMs 115A-N of the MPC6 system 113 at the server system 102 can create the signing policy according to parameters defined by the primary client device 108 in block C-2, 308 (block C-3, 310). The signing policy can be created at the server system 102 with multiple different transaction values and/or business logic. Creating the signing policy can, for example, include generating cryptographic logic to then be executed by the policy engine 110 during runtime use.

The primary client device 108 can initiate a transaction request in block D (312).

The transaction request can be sent to the policy engine 110, which can cryptographically verify that the transaction request satisfies the signing policy cryptographic logic (block E, 314). The policy engine 110 can also determine, based on transaction details in the transaction request, how many signing client devices are required.

The policy engine 110 can transmit an automated request for transaction authorization to the determined number of the signing client devices 112A-N needed for authorizing the particular transaction request (block F, 316). In some implementations, the request can be sent to a threshold quantity of the signing client devices 112A-N that is greater than a required number of signing client devices 112A-N to authorize the transaction. The request can be sent to just the required number of signing client devices 112A-N to authorize the transaction, as mentioned above. In some implementations, the server system 102 can receive the authorization requests and broadcast those requests to the signing client devices 112A-N.

One or more of the signing client devices 112A-N can authorize the transaction request (block G, 318). Authorization results can be transmitted from the signing client devices 112A-N to the MPC6 system 113. The MPC6 system 113 may communicate the authorization results to the policy engine 110.

If the policy engine 110 determines that the required number of signing client devices 112A-N (as defined by the signing policy or other parameters defined by the primary client device 108) authorize the transaction in G (318), the policy engine 110 can transmit a payload for the transaction to the one or more HSMs 115A-N to perform an MPC signing operation to then generate the authorization payload that will be presented/transmitted to the software module 106A-N of one or more of the HSMs 104A-N (block H, 320). As described further below, once the HSMs 104A-N receive the authorization payload from the HSMs 115A-N, the HSMs 104A-N can sign and broadcast the transaction to the blockchain(s) 114.

The software module 106A-N can then create a crypto private key for the primary client device 108 and sign the transaction based on information provided in the payload (block I, 322). For example, the software module 106A of the HSM 104A can receive the cryptographic logic that is generated as part of creating the signing policy and use the logic to validate the authorization results from the signing client devices 112A-N and sign the transaction.

The signed transaction is then broadcasted to the blockchain(s) 114 (block J, 324). The broadcasting can be performed by a third-party node that is designated/chosen by the primary client device 108. As an illustrative example, the server system 102 can provide the primary client device 108 with a selection of third-party nodes from which the primary client device 108 can choose for broadcasting the signed transaction. In some implementations, the primary client device 108 can download the signed transaction and then broadcast the transaction on their own to the blockchain(s) 114. The broadcasting can be performed directly or indirectly by the HSM 104A.

As described throughout this disclosure, a cryptocurrency wallet operating on the HSMs 104A-N may not be a multi-signature wallet since only a single crypto private key is used by the HSMs 104A-N to sign transactions and that private key is not shared or otherwise distributed. The private key can be split up and secured by additional secrets that are associated with user accounts (e.g., the multiple signing client devices 112A-N). However, the concept of multiple signing client devices 112A-N confirming or authorizing before a proposed transaction can proceed, none of which may be controlled by the server system 102 itself, can be functionally similar with un-hosted multi-signature wallets, but with cryptographic security instead. Although the signing client devices 112A-N must validate each transaction request using their own credentials (e.g., username and password) and organizational x509 certificate, those signatures effectively can act as passcodes that are then used collectively to enable the crypto private key to be computed and then used to sign transactions. Accordingly, while the use of a sufficient number of signing client devices 112A-N credentials are a necessary condition to the HSMs 104A-N signing a transaction request, the signing client devices 112A-N are not themselves signing the transaction request using a wallet private key. Rather, the signing client devices 112A-N can provide their approval of the transaction request through cryptographic key technology that confirms they are indeed the signing client devices 112A-N with the authority to provide approval of the transaction request.

Figure 4A:
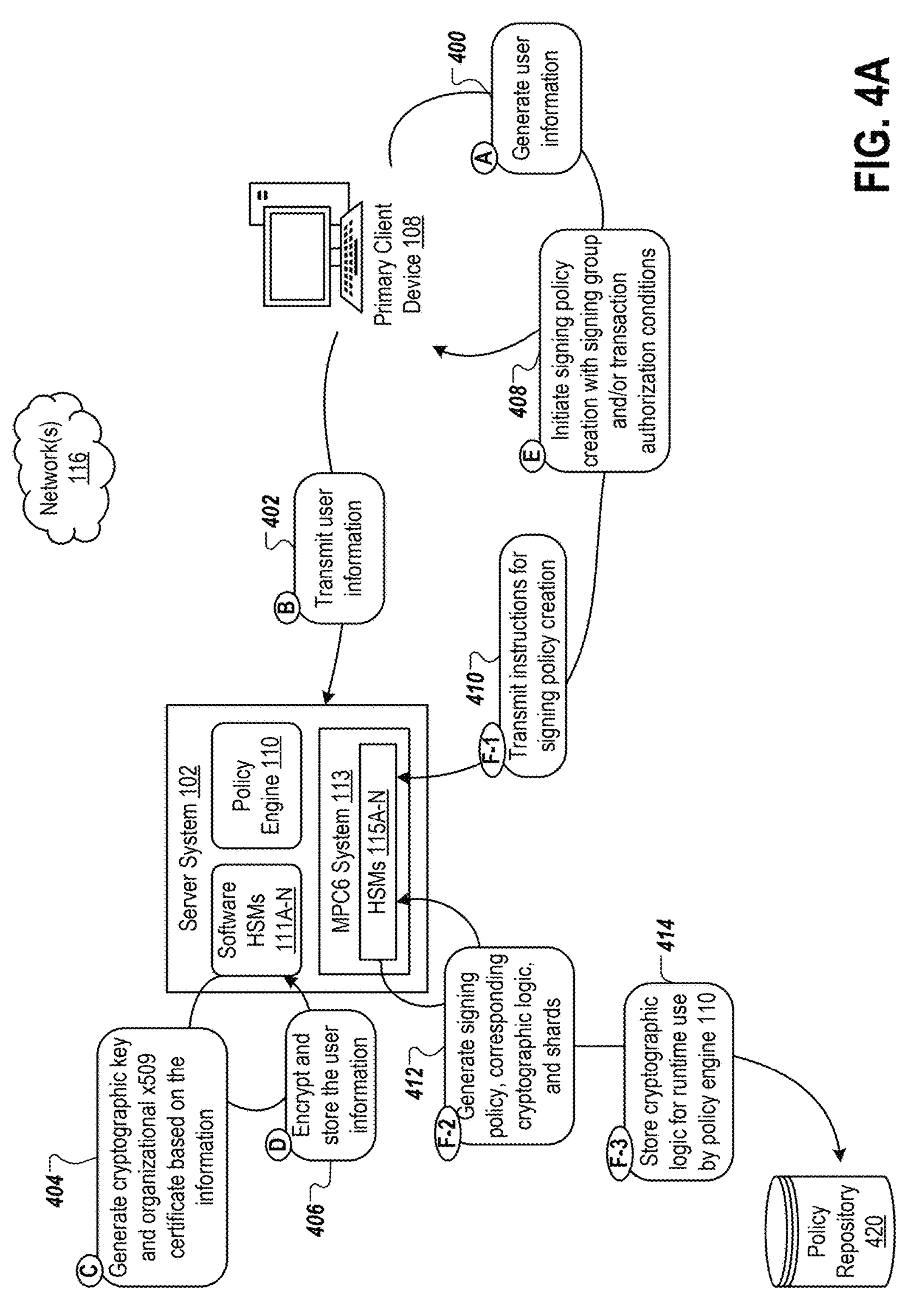
FIG. 4A is a conceptual diagram of a system for generating private keys.

FIG. 4A is a conceptual diagram of the system 100 for generating private keys. The party at the primary client device 108 can generate user information in block A (400) using the software provided by the server system 102. Generating the user information can include creating a username and password for use with the software platform offered by the server system 102.

The user information can be transmitted to the server system 102 (block B, 402).

One or more of the software HSMs 111A-N of the server system 102 can generate a cryptographic key and organizational x509 certificate for the party of the primary client device 108 based on the user information in block C (404). The cryptographic key can include a public private key pair.

In block D (406), the one or more HSMs 111A-N can encrypt and store the user information. The encryption and storage can be done locally at the server system 102. For example, the party's username and password can be stored in encrypted form at the server system 102 in order to validate the party's access for certain account management functions with the software platform. Such encryption can prevent the server system 102 from viewing or accessing the party's password. The server system 102 may not store the cryptographic key and/or the organizational x509 certificate, in some implementations.

The party at the primary client device 108 can also initiate creation of a signing policy with a signing group and/or transaction authorization conditions (block E, 408). To initiate the creation of the signing policy, the party can provide user inputs to an automated web form developed and provided by the server system 102 in which the party can designate one or more parties in a signing group (e.g., signing parties) that will be asked for authorization/confirmation regarding transactions initiated by the primary client device 108. Such transactions can include, for example, transferring cryptocurrency from one or more cryptocurrency wallets created within the server system 102 and/or one or more wallets that are created in other networks outside of the server system 102. For the signing policy, the party can also designate a required number of authorizations that would be required to approve and execute such transactions that are requested by the primary client device 108.

In some implementations, the signing policy can specify a different required number of authorizations for transactions having different parameters. The parameters can include, but are not limited to, size (e.g., amount of currency being transacted), type of currency, parties involved, wallets involved, and other transaction conditions. For example, the party may designate a signing group of four parties: A, B, C, and D, and require that transactions in BITCOIN below 5 BTC require confirmation of two signing parties in the signing group to proceed, while transactions of 5 BTC or greater would require confirmations from all four signing parties in the signing group to proceed. The party at the primary client device 108 can also securely approve the created signing policy by signing a transaction using their cryptographic key and the organizational certificate (e.g., through providing their user information, such as username and password). As described further throughout this disclosure, the automated policy engine 110, which determines if the requirements of the signing policy have been met with respect to any transaction to be made from the wallet associated with the primary client device 108, runs on the server system 102. However, the server system 102 cannot manually intervene in a transaction request, authorization, and validation process, and the policy engine 110 simply cryptographically verifies the validity of the user information and threshold requirements set by the party at the primary client device 108.

The party can initiate the creation of several signing policies, each to govern different transactions. For example, the party can initiate generating a signing policy to be used by the policy engine 110 to govern how a cryptocurrency transaction may be initiated from the software platform offered by the server system 102. The signing policy can cause creation of client-side cryptographic secret shares, which can be encoded data pieces that enable parties, such as the signing client devices 112A-N described herein, to perform joint computations without revealing information about underlying inputs. As a result, the server system 102 may not have access to the crypto private keys, such as the cryptographic key that is generated for the party of the primary client device 108 and/or a wallet associated with the primary client device 108.

The primary client device 108 transmits instructions for creating the signing policy to the MPC6 system 113 (block F-1, 410), and more specifically one or more of the HSMs 115A-N of the MPC6 system 113.

In block F-2 (412), the one or more HSMs 115A-N can generate the signing policy, additional corresponding cryptographic logic, and shards that correlate to the signing policies used by and in the policy engine 110. The shards or shares can be assigned to one or more of the signing client devices 112A-N. The cryptographic logic can include rules that the policy engine 110 uses during runtime to validate a transaction request according to the transaction authorization conditions that the primary client device 108 established for the signing policy. The cryptographic logic can then be stored in a policy repository 420 (e.g., database, data store, cloud-based storage system, etc) for runtime use by the policy engine 110 (block F-3, 414).

Figure 4B:
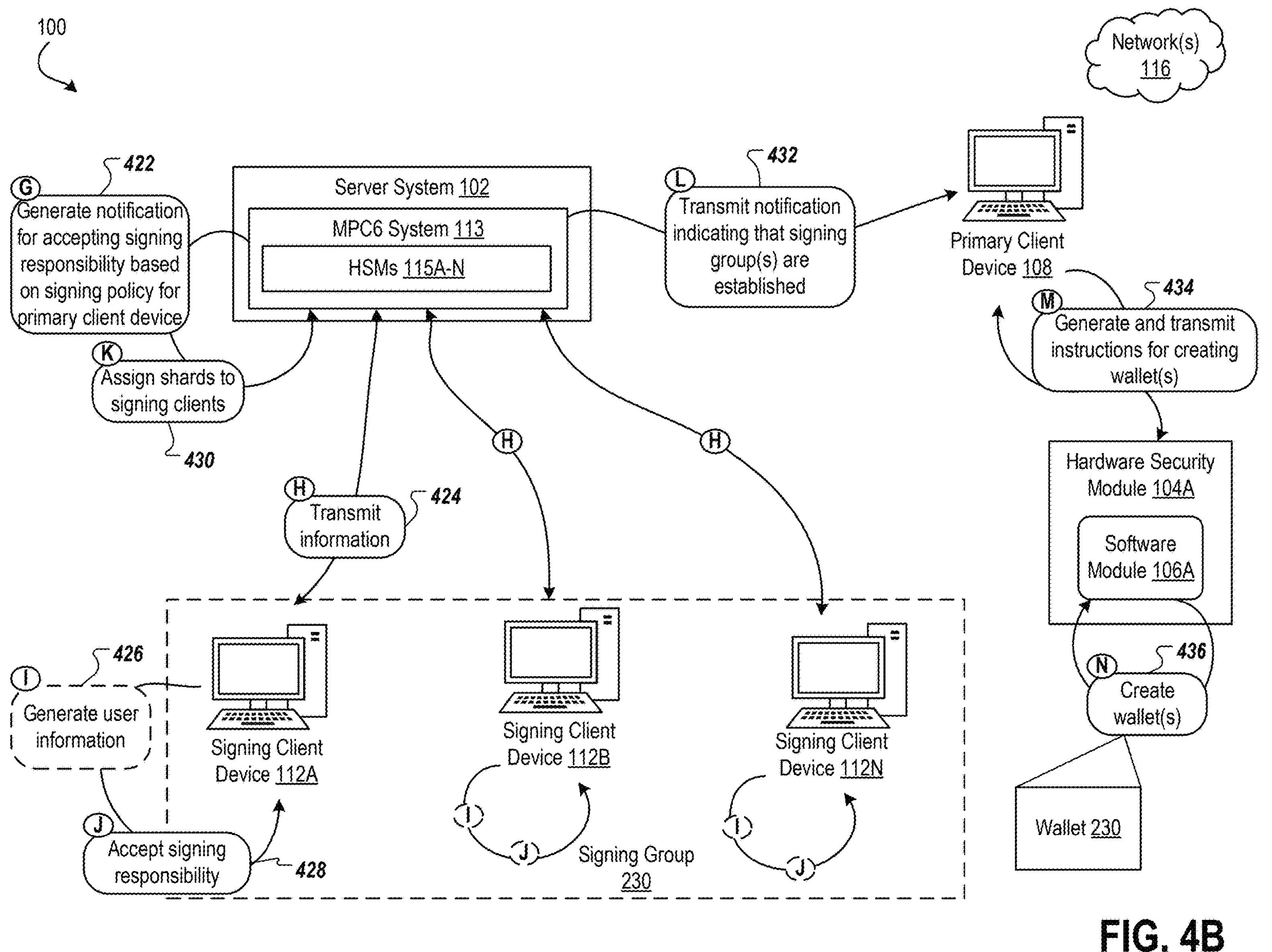
FIG. 4B is a conceptual diagram of a system for establishing signing group(s) to sign transactions according to user-defined signing policies.

FIG. 4B is a conceptual diagram of the system 100 for establishing signing group(s) to sign transactions according to user-defined signing policies. As described in reference to FIG. 4A, the party at the primary client device 108 can define signing policies that indicate how transaction requests are handled and validated. In a signing policy, the party can designate the signing client devices 112A-N as part of a signing group 230 and can also designate a required number of the signing client devices 112A-N in the signing group 230 that must authorize or confirm a transaction before the transaction can be validated/verified.

Once the signing policy is generated (refer to FIG. 4A), the MPC6 system 113 (or more specifically, one or more of the HSMs 115A-N) can generate a notification for accepting a signing responsibility (block G, 422). For example, the primary client device 108 can send a request to the server system 102 to create the signing group 230. The server system 102 can then sign the request using the user information for the party of the primary client device 108 (e.g., the public private key pay for the party). The signed request can then be broadcasted to each of the signing client devices 112A-N that are designated by the primary client device 108 in the request.

Information can be transmitted between the MPC6 system 113 and the designated signing client devices 112A-N in the signing group 230 (block H, 424). The information can include, for example, the notification that was generated in block G, 422.

If any of the signing client devices 112A-N haven't already, they can generate user information in block I (426). For example, if a party at a signing client device 112 does not have a username and password set up with the software platform provided by the server system 102, then block I, 216, can be performed at their signing client device 112. In some implementations, the signing client devices 112A-N can generate their user information before being added to a signing group or otherwise designated for the signing group by the primary client device 108. Once the party provides a username and password, a credential specific to the party and an x509 certificate can be generated for the party. If the party already has account information/credentials with the software platform of the server system 102, block I, 426, may not be performed.

The parties at the respective signing client devices 112A-N can accept their signing responsibilities in block J (428). In other words, each of the parties designated by the party at the primary client device 108 as being part of the signing group 230 must accept their appointment to the signing group 230. As an illustrative example, the parties at their signing client devices 112A-N can receive a prompt (e.g., notification, message) at their devices to onboard with the software platform as described above in reference to block I (426). As mentioned above, if a party already has generated their user information, block I (426) can be skipped and block J (428) can be performed after block H (424). The server system 102 can perform an integrity check and signing lockup on the request to accept the signing possibility to validate the identified of the requesting party against the user x509 certification for the requesting party. When all the requests pass (e.g., the signing client devices 112A-N accept the signing responsibility), MPC shard generation can be called or otherwise performed at the server system 102, as described below.

Once the party accepts the signing responsibility at the respective signing client device 112A-N, a notification indicating the acceptance can be transmitted back to the MPC6 system 113 (block H, 424).

If the parties accept the signing responsibility, then the server system 102 can assign the shards (e.g., shares) that were previously generated, as described in FIG. 4A, to the signing client devices 112A-N (block K, 430). The server system 102 can call an MPC shard generation process to be performed. Using the user x509 certificate that was generated for the party of the primary client device 108, the server system 102 can register each of the shards to a party at the signing client devices 112A-N.

The MPC6 system 113 can also transmit a notification to the primary client device 108 indicating that the signing group 230 is established (e.g., the signing client devices 112A-N accepted the signing responsibility) in block L (432).

The primary client device 108 can then generate and transmit instructions to create one or more wallets to the HSM 104A (block M, 434). For example, using the credentials and organizational certificate, the primary client device 108 can direct the server system 102's automated software module 106A at the HSM 104A to create a public wallet address with an associated crypto private key (block N, 436). This credential and wallet creation request can undergo an automated systems check to ensure the request is created correctly without technical errors, and then communicated to one or more of the HSMs described herein. The HSM(s) can then create a public-private key pair, and the public wallet address can be displayed to the party at the primary client device 108. Thus, a wallet 230 for the party at the primary client device 108 can be created (block N, 436). In some implementations MPC authentication techniques can be layered with the wallet 230. The crypto private key may neither be displayed at the primary client device 108 nor be viewable or accessible to the server system 102.

FIG. 5 is a conceptual diagram of the system 100 for initiating transactions and obtaining approval or authorization by signing client devices according to user-defined signing policies. Such transactions can include sending cryptocurrency from one wallet to another. Such transactions can also include sending other types of assets between different parties across networks, such as blockchains.

Using a web portal 501, the primary client device 108 can initiate a transaction request in block A (500). In some implementations, another party designated to raise transactions, but not designated as a signing party, can perform block A (500) to send cryptocurrency from their wallet to another wallet. Initiating the transaction request can include providing user input at the primary client device 108 designating an amount of cryptocurrency to be sent and a recipient's pubic wallet address.

The web portal 501 can be provided as part of the software platform of the server system 102. The web portal 501 can provide a web and/or mobile interface for the party at the primary client device 108 to manage their account, transactions, and/or wallets. The web portal 501 can also be provided to the signing client devices 112A-N to allow for the parties of these devices to perform actions with respect to their account, transactions, and/or wallets (such as authorizing the transaction request initiated by the primary client device 108).

The primary client device 108 can validate the transaction request based on the user information (e.g., their username and/or password) and organization certificate of the party associated with the primary client device 108 (block B, 502). Block B (502) can be performed using software that is provided by the server system 102 to the primary client device 108.

The primary client device 108 can transmit the encrypted transaction request upon validation to the server system 102 in block C (504). More particularly, the encrypted transaction request can be sent to the policy engine 110.

In block D-1 (506), the policy engine 110 can retrieve cryptographic logic associated with the signing policy for the primary client device 108 from the policy repository 420. In some implementations, the policy engine 110 may already have the cryptographic logic locally accessible after the logic is generated by the server system 102, as described in reference to FIG. 4A.

Then, in block D-2 (508), the policy engine 110 can cryptographically verify that the transaction request parameters satisfy the cryptographic logic associated with the signing policy of the primary client device 108 (e.g., the party that initiated the transaction request in block A, 500). For example, the policy engine 110 can apply the logic or other rules to data or other information in the transaction request, which can designate a required number of transaction authorizations/confirmations of the signing client devices 112A-N in the signing group 230.

Once the policy engine 110 verifies that the parameters of the signing policy are met, the policy engine 110 can transmit an automated request for transaction authorization to the signing client devices 112A-N that are designated as part of the signing group 230 according to the signing policy (block E, 510). In some implementations, there can be a time-to-live in which the policy engine 110 waits for authorization from the signing client devices 112A-N. This time period can be predetermined. For example, the time period can be set by the server system 102. As another example, the time period can be set by the primary client device 108 in the associated signing policy. The time period can be an arbitrary time window, including but not limited to 1 minute, 3 minutes, 5 minutes, 10 minutes, 15 minutes, 30 minutes, 1 hour, etc. The time period can be adjustable by the primary client device 108, in some implementations. If the required number of signing client devices 112A-N does not authorize the transaction, then the transaction may be dropped and registered as a transaction signing failed event. Such information can be transmitted/relayed back to the primary client device 108, in some implementations.

One or more of the signing client devices 112A-N can authorize the transaction in block F (512) and transmit authorization results back to the policy engine 110 (block G, 514). For example, each of the signing client devices 112A-N can receive an authorization/confirmation request notifying the relevant party of the transaction request initiated by the primary client device 108. The request can also present the party with the ability to authorize the transaction request using their respective credentials/user information (e.g., username and/or password) and organizational x509 certificate.

In some implementations, one or more of the signing client devices 112A-N may not authorize the transaction. If a required number of signing client devices 112A-N do not authorize the transaction, then the transaction may not be validated and thus the transaction may not be completed. If, on the other hand, the required number of signing client devices 112A-N authorize the transaction, then the transaction can be validated and completed.

FIG. 6 is a system diagram of components that can perform the disclosed techniques. As described herein, the server system 102, HSMs 104A-N, primary client device 108, signing client devices 112A-N, blockchain(s) 114, MPC group authentication data store 180, policy repository 420, and key store HSM 650 can communicate via the network(s) 116. As described herein, a party at the primary client device 108 can transact with another party over the blockchain(s) 114 using the disclosed technology. The disclosed system components can be provided as software as a service.

The server system 102 can include various software components, including but not limited to the policy engine 110 described herein, software HSMs 111A-N described herein, the MPC6 system 113 having the HSMs 115A-N (e.g., hardware components), a user interface engine 600, user interface APIs 608, and core(s) 618. In some implementations, the policy engine 110 can be one of the user interface APIs 608. The server system 102 can also generate and provide the software modules 106A-N to the HSMs 104A-N. The server system 102 can also provide an asynchronous MPC messaging network. Since the server system 102 can be separate from the HSMs 104A-N, the server system 102 components (e.g., software) can be deployed across a number of different industries and use cases, including but not limited to defense, healthcare, traditional banking, and/or building access controls.

The user interface engine 600 can include a web interface 602, mobile application 604, and/or internal middle office 606. The user interface engine 600 can be configured to implement logic for parties at the primary client device 108, the signing client devices 112A-N, or other client devices to manage their accounts and generate and perform transactions. The user interface engine 600 components can be provided as software as a service and/or with private cloud management.

The user interface APIs 608 can include a transaction and audit API 610, transaction builder 612, event queuing and management API 614, and/or a coordinator 616. The APIs 608 can be configured to implement and/or provide logic for techniques such as transaction assembly, signing policy evaluation, and transaction signing. The user interface APIs 608 can be provided as software as a service. Sometimes, the APIs 608 can be provided as software enclaves that can be partly hosted within a client device/computing system estate. The APIs 608 can be used as a threshold authentication and/or authorization platform irrespective of a domain application. The APIs 608 can additionally and/or alternatively be used to provide one or more of the following functions to parties at the primary client device 108 and the signing client devices 112A-N: creating user accounts, creating signing groups, setting threshold numbers of signing client devices, adding signing client devices to signing groups, removing signing client devices from the signing groups, setting message payloads, returning message payloads, setting and returning event model loops, and other functions.

The HSMs 104A-N software module 104 can be offered as software as a service across various different computing devices, systems, and/or networks in multiple different geographies. The HSMs 104A-N, via the software modules 106A-N, can be configured to store wallet information, in some implementations. In some implementations, one or more of the HSMs 104A-N may be partly hosted within the client device/computing system estate.

Figure 7:
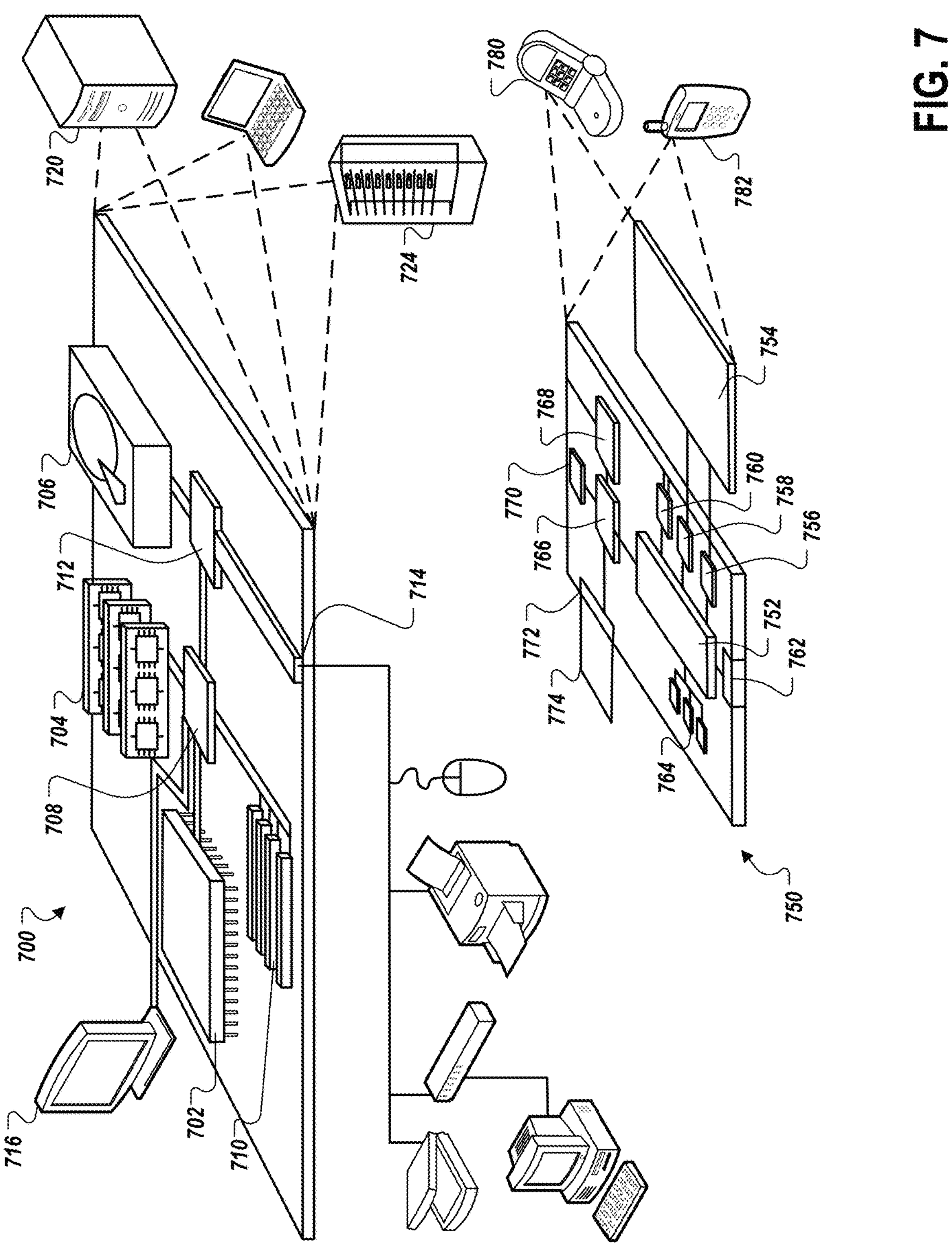
FIG. 7 is a schematic diagram that shows an example of a computing device and a mobile computing device.

FIG. 7 shows an example of a computing device 700 and an example of a mobile computing device that can be used to implement the techniques described here. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and can be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 can also be another form of computer-readable medium, such as a magnetic or optical disk.

The storage device 706 is capable of providing mass storage for the computing device 700. In some implementations, the storage device 706 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer-or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which can accept various expansion cards (not shown). In the implementation, the low-speed interface 712 is coupled to the storage device 706 and the low-speed expansion port 714. The low-speed expansion port 714, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 700 can be implemented in a number of different forms, as shown in the figure. For example, it can be implemented as a standard server 720, or multiple times in a group of such servers. In addition, it can be implemented in a personal computer such as a laptop computer 722. It can also be implemented as part of a rack server system 724. Alternatively, components from the computing device 700 can be combined with other components in a mobile device (not shown), such as a mobile computing device 750. Each of such devices can contain one or more of the computing device 700 and the mobile computing device 750, and an entire system can be made up of multiple computing devices communicating with each other.

The mobile computing device 750 includes a processor 752, a memory 764, an input/output device such as a display 754, a communication interface 766, and a transceiver 768, among other components. The mobile computing device 750 can also be provided with a storage device, such as a micro-drive or other device, to provide additional storage. Each of the processor 752, the memory 764, the display 754, the communication interface 766, and the transceiver 768, are interconnected using various buses, and several of the components can be mounted on a common motherboard or in other manners as appropriate.

The processor 752 can execute instructions within the mobile computing device 750, including instructions stored in the memory 764. The processor 752 can be implemented as a chipset of chips that include separate and multiple analog and digital processors. The processor 752 can provide, for example, for coordination of the other components of the mobile computing device 750, such as control of user interfaces, applications run by the mobile computing device 750, and wireless communication by the mobile computing device 750.

The processor 752 can communicate with a user through a control interface 758 and a display interface 756 coupled to the display 754. The display 754 can be, for example, a TFT (Thin-Film-Transistor Liquid Crystal Display) display or an OLED (Organic Light Emitting Diode) display, or other appropriate display technology. The display interface 756 can comprise appropriate circuitry for driving the display 754 to present graphical and other information to a user. The control interface 758 can receive commands from a user and convert them for submission to the processor 752. In addition, an external interface 762 can provide communication with the processor 752, so as to enable near area communication of the mobile computing device 750 with other devices. The external interface 762 can provide, for example, for wired communication in some implementations, or for wireless communication in other implementations, and multiple interfaces can also be used.

The memory 764 stores information within the mobile computing device 750. The memory 764 can be implemented as one or more of a computer-readable medium or media, a volatile memory unit or units, or a non-volatile memory unit or units. An expansion memory 774 can also be provided and connected to the mobile computing device 750 through an expansion interface 772, which can include, for example, a SIMM (Single In Line Memory Module) card interface. The expansion memory 774 can provide extra storage space for the mobile computing device 750, or can also store applications or other information for the mobile computing device 750. Specifically, the expansion memory 774 can include instructions to carry out or supplement the processes described above, and can include secure information also. Thus, for example, the expansion memory 774 can be provide as a security module for the mobile computing device 750, and can be programmed with instructions that permit secure use of the mobile computing device 750. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer-or machine-readable medium, such as the memory 764, the expansion memory 774, or memory on the processor 752. In some implementations, the computer program product can be received in a propagated signal, for example, over the transceiver 768 or the external interface 762.

The mobile computing device 750 can communicate wirelessly through the communication interface 766, which can include digital signal processing circuitry where necessary. The communication interface 766 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 768 using a radio-frequency. In addition, short-range communication can occur, such as using a Bluetooth, WiFi, or other such transceiver (not shown). In addition, a GPS (Global Positioning System) receiver module 770 can provide additional navigation-and location-related wireless data to the mobile computing device 750, which can be used as appropriate by applications running on the mobile computing device 750.

The mobile computing device 750 can also communicate audibly using an audio codec 760, which can receive spoken information from a user and convert it to usable digital information. The audio codec 760 can likewise generate audible sound for a user, such as through a speaker, e.g., in a handset of the mobile computing device 750. Such sound can include sound from voice telephone calls, can include recorded sound (e.g., voice messages, music files, etc.) and can also include sound generated by applications operating on the mobile computing device 750.

The mobile computing device 750 can be implemented in a number of different forms, as shown in the figure. For example, it can be implemented as a cellular telephone 780. It can also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for adjusting a quantity of users in a signing group for authorizing transactions utilizing multi-party-computation (MPC) across a network, the method comprising:

receiving, by a server from a first signing client device amongst a plurality of signing client devices included in a signing group, a request to add or remove at least one signing client device from the signing group, wherein the signing group includes a polynomial designating a first threshold of signing client devices in the signing group that is required to authorize a transaction using respective shares of a cryptographic key;

transmitting, by the server to each remaining signing client device in the signing group, a request for authorizing the request to add or remove the at least one signing client device from the signing group;

receiving, by the server from each remaining signing client device in the signing group, authorization of the request to add or remove the at least one signing client device from the signing group, wherein a modified signing group including a modified group of signing client devices results from the authorization of the request;

initiating, by the server in response to receiving the authorization from each remaining signing client device, communication amongst the modified group of signing client devices to generate new shares of the cryptographic key, wherein generating the new shares of the cryptographic key comprises:

computing a bivariate polynomial that has a second threshold signing requirement different from the first threshold, wherein the bivariate polynomial further comprises a constant coefficient that is shared amongst two univariate polynomials, wherein the two univariate polynomials are derived from the polynomial associated with the first threshold and the signing group, and dynamically generating group authentication information associated with the modified group of signing client devices that includes the bivariate polynomial and the second threshold;

authenticating, by the server, the new shares using the second threshold; and returning, by the server, authentication of the new shares of the cryptographic key.

2. The method of claim 1, wherein returning, by the server, authentication of the new shares of the cryptographic key comprises updating authentication information associated with the signing group to include information comprising unique identifiers corresponding to each signing client device of the modified group of signing client devices.

3. The method of claim 1, wherein initiating, by the server in response to receiving the authorization from each remaining signing client device, communication amongst the modified group of signing client devices to generate new shares of the cryptographic key comprises:

generating, by each signing client device in the modified group of signing client devices, a new random polynomial where a constant coefficient of the new random polynomial is an old share for the respective signing client device with the second threshold.

4. The method of claim 3, further comprising distributing, by each signing client device in the modified group of signing client devices, the new shares based on generating the new random polynomials.

5. The method of claim 3, further comprising:

aggregating, by each signing client device in the modified group of signing client devices, the new random polynomials of the signing client devices in the modified group to construct the bivariate polynomial of a degree to the first threshold in one dimension and the second threshold in a different dimension.

6. The method of claim 4, further comprising:

deleting, by each signing client device in the modified group of signing client devices, non-used shares of the cryptographic key.

7. The method of claim 1, further comprising:

receiving, by the server and from a primary client device, policy data that defines a transaction signing policy, wherein the policy data comprises:

(i) a designation of the signing group, (ii) a designation of the plurality of signing client devices that are included in the signing group, and (iii) for each transaction class of a plurality of transaction classes, a corresponding first threshold number of the plurality of signing client devices that is required to authorize the transaction, wherein the transaction is a member of the transaction class.

8. The method of claim 1, wherein the bivariate polynomial is private and unknown to each signing client device in the modified group of signing client devices.

9. The method of claim 1, wherein each signing client device in the modified group of signing client devices is configured to aggregate a respective new share with a respective original share to update the respective original share without changing the cryptographic key.

10. A system for adjusting a quantity of users in a signing group for authorizing transactions utilizing multi-party-computation (MPC) across a network, the system comprising:

a plurality of signing client devices; and a server in wireless network communication with the plurality of signing client devices, wherein the server is configured to:

receive, from a first signing client device amongst the plurality of signing client devices included in a signing group, a request to add or remove at least one signing client device from the signing group, wherein the signing group includes a polynomial designating a first threshold of signing client devices in the signing group that is required to authorize a transaction using respective shares of a cryptographic key;

transmit, to each remaining signing client device in the signing group, a request for authorizing the request to add or remove the at least one signing client device from the signing group;

receive, from each remaining signing client device in the signing group, authorization of the request to add or remove the at least one signing client device from the signing group, wherein a modified signing group including a modified group of signing client devices results from the authorization of the request;

initiate, in response to receiving the authorization from each remaining signing client device, communication amongst the modified group of signing client devices to generate new shares of the cryptographic key, wherein generating the new shares of the cryptographic key comprises:

computing a bivariate polynomial that has a second threshold signing requirement different from the first threshold, wherein the bivariate polynomial further comprises a constant coefficient that is shared amongst two univariate polynomials, wherein the two univariate polynomials are derived from the polynomial associated with the first threshold and the signing group, and dynamically generating group authentication information associated with the modified group of signing client devices that includes the bivariate polynomial and the second threshold;

authenticate the new shares using the second threshold; and return authentication of the new shares of the cryptographic key.

11. The system of claim 10, wherein returning authentication of the new shares of the cryptographic key comprises updating authentication information associated with the signing group to include information comprising unique identifiers corresponding to each signing client device of the modified group of signing client devices.

12. The system of claim 11, wherein the modified group of signing client devices includes the at least one signing client device that was added or removed from the signing group in response to and based on receiving the authorization of the request to add or remove the at least one signing client device from the signing group.

13. The system of claim 10, wherein initiating, in response to receiving the authorization from each remaining signing client device, communication amongst the modified group of signing client devices to generate new shares of the cryptographic key comprises:

generating, by each signing client device in the modified group of signing client devices, a new random polynomial where a constant coefficient of the new random polynomial is an old share for the respective signing client device with the second threshold.

14. The system of claim 13, further comprising distributing, by each signing client device in the modified group of signing client devices, the new shares based on generating the new random polynomials.

15. The system of claim 13, further comprising:

aggregating, by each signing client device in the modified group of signing client devices, the new random polynomials of the signing client devices in the modified group to construct the bivariate polynomial of a degree to the first threshold in one dimension and the second threshold in a different dimension.

16. The system of claim 15, further comprising:

deleting, by each signing client device in the modified group of signing client devices, non-used shares of the cryptographic key.

17. The system of claim 10, wherein the server is further configured to:

receive, from a primary client device, policy data that defines a transaction signing policy, wherein the policy data comprises:

(i) a designation of the signing group, (ii) a designation of the plurality of signing client devices that are included in the signing group, and (iii) for each transaction class of a plurality of transaction classes, a corresponding first threshold number of the plurality of signing client devices that is required to authorize the transaction, wherein the transaction is a member of the transaction class.

18. The system of claim 10, wherein the bivariate polynomial is private and unknown to each signing client device in the modified group of signing client devices.

19. The system of claim 10, wherein each signing client device in the modified group of signing client devices is configured to aggregate a respective new share with a respective original share to update the respective original share without changing the cryptographic key.

20. The system of claim 10, wherein the request to add or remove at least one signing client device from the signing group is received in response to initiating a regeneration cycle for the cryptographic key.

* * * * *